United States Patent [19]

Takeo

[11] Patent Number: 5,796,870

[45] Date of Patent: Aug. 18, 1998

[54] METHOD AND APPARATUS FOR COMPRESSING DYNAMIC RANGES OF IMAGES

[75] Inventor: Hideya Takeo, Kanagawa-ken, Japan

[73] Assignee: Fuji Photo Film Co., Ltd., Kanagawa-Ken, Japan

[21] Appl. No.: 635,387

[22] Filed: Apr. 19, 1996

[30] Foreign Application Priority Data

Apr. 20, 1995 [JP] Japan .................................. 7-094932

[51] Int. Cl.$^6$ .................................................. G06K 9/00
[52] U.S. Cl. .......................................... 382/232; 382/128
[58] Field of Search ...................... 382/168, 181, 382/232, 233, 235, 236, 238, 239, 240, 244, 248, 251, 252, 253, 254, 256, 257, 260, 269, 270, 273, 274, 275, 276, 277, 282, 283, 286, 291, 293, 299, 300, 302, 305, 307, 308, 309, 312, 190, 191, 128, 192, 195, 201, 203, 217, 224, 228, 243, 264, 132; 250/337, 587, 580; 348/367, 162, 217

[56] References Cited

U.S. PATENT DOCUMENTS

| | | | |
|---|---|---|---|
| 4,315,318 | 2/1982 | Kato et al. | 364/515 |
| 4,918,534 | 4/1990 | Lam et al. | 358/225 |
| 5,319,719 | 6/1994 | Nakazawa et al. | 382/6 |
| 5,447,811 | 9/1995 | Buhr et al. | 430/20 |
| 5,454,044 | 9/1995 | Nakajima | 382/132 |
| 5,493,622 | 2/1996 | Tsuchino et al. | 382/132 |

FOREIGN PATENT DOCUMENTS 6-292013  10/1994  Japan ........................... H04N 1/40

OTHER PUBLICATIONS

Jin et al., "Extraction of Small Calcified Patterns with A Morphology Filter Using A Multiply Structure Element," Jul. 1992, D–II vol. J75–D–II No. 7 pp. 1170–1176 (no place of publication).

*Primary Examiner*—Leo H. Boudreau
*Assistant Examiner*—Bijan Tadayon
*Attorney, Agent, or Firm*—Sughrue, Mion, Zinn, Macpeak & Seas, PLLC

[57] ABSTRACT

An unsharp mask signal Lu, which corresponds to super-low frequency, is calculated from an original image signal Dorg representing an original image. The rate of compression, at which the dynamic range of the original image is compressed, is changed in accordance with the unsharp mask signal Lu. A dynamic range compressing process is carried out with respect to each of picture elements in the original image, with the rate of compression being thus changed for each of the picture elements. The dynamic range compressing process is carried out with Formula (1)

$$Dproc = Dorg + f(Lu) \qquad (1)$$

and a processed image signal Dproc is thereby obtained. The unsharp mask signal Lu represents the mean value of the image signal values of all picture elements located within a rectangular unsharp mask having shorter sides, which extend across an edge of a region of interest in the original image, and longer sides extending in the direction along which the edge extends.

48 Claims, 6 Drawing Sheets

F I G. 1
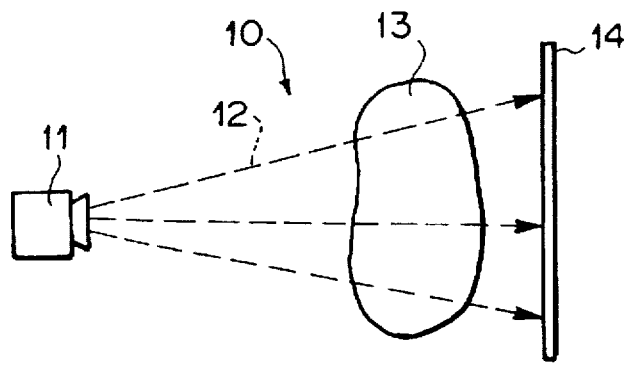
F I G. 2
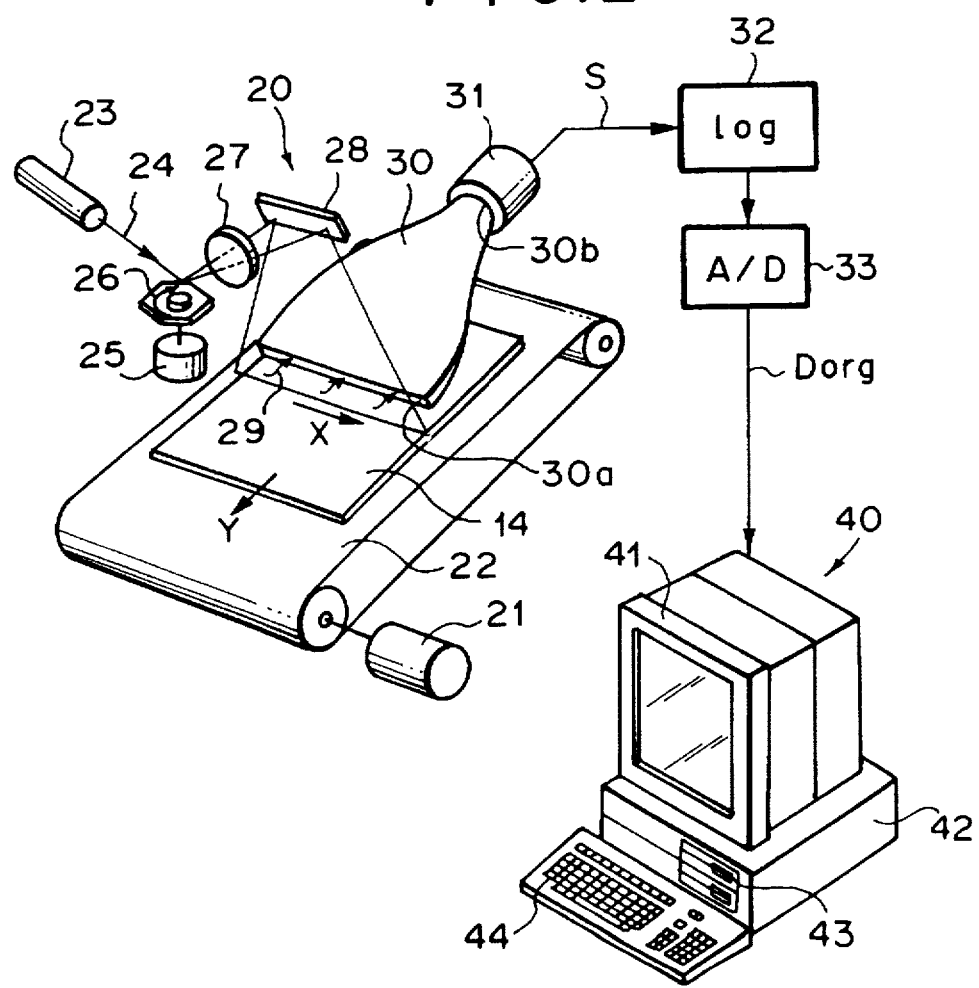

N × N MASK  ARTIFICIAL BONE PATTERN

METHOD AND APPARATUS FOR COMPRESSING DYNAMIC RANGES OF IMAGES

BACKGROUND OF THE INVENTION

1. Field of the Invention

This invention relates to a method and apparatus for compressing a dynamic range of an image. This invention particularly relates to a method and apparatus for compressing a dynamic range of an image, with which an original image signal representing an original image is processed, and a processed image signal representing an image having a narrower dynamic range than the original image is thereby generated.

2. Description of the Prior Art

Techniques for photoelectrically reading out a radiation image, which has been recorded on a photographic film, in order to obtain an image signal, carrying out appropriate image processing on the image signal, and then reproducing a visible image by use of the processed image signal have heretofore been known in various fields. For example, an X-ray image is recorded on an X-ray film having a small gamma value chosen according to the type of image processing to be carried out, and the X-ray image is read out from the X-ray film and converted into an electric signal (i.e., an image signal). The image signal is processed and then used for reproducing the X-ray image as a visible image on a photocopy, or the like. In this manner, a visible image having good image quality with high contrast, high sharpness, high graininess, or the like, can be reproduced.

Further, it has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

In the image recording and reproducing systems, with which the image signals are generated and visible images are reproduced from the image signals, it often occurs that portions of an image, which are to be used and therefore are required to have an appropriate image density in the reproduced image, have image density levels ranging widely from a low density to a high density. Also, the problems often occur in that it is unclear what portions of an image having which range of image density are to be used and therefore are required to have an appropriate image density in the reproduced image. In such cases, the image signal representing the original image is processed such that the high-density portions of the original image may have an appropriate level of image density in the reproduced image. Also, the image signal representing the original image is processed such that the low-density portions of the original image may have an appropriate level of image density in the reproduced image. Thereafter, both the images reproduced from the image signals, which have thus been processed in different ways, are displayed side by side on a single display device.

However, if a plurality of images are displayed side by side on a single display device, the problems will occur in that the images inevitably become small in size and therefore hard to observe.

In order that portions of an image covering as wide a range of image density as possible can be used, the level of contrast of the portions of the image having a high or low image density or the level of contrast of the entire area of the image has heretofore been rendered low such that the difference between the highest image density and the lowest image density may become small, i.e. such that the dynamic range of the image may become narrow.

However, if the level of contrast is rendered low, the problems will occur in that details of the image information in the image region, at which the level of contrast has been lowered, becomes hard to observe.

Accordingly, in U.S. Pat. No. 5,454,044, the applicant proposed a method for compressing a dynamic range of an image, comprising the steps of:

i) setting an unsharp mask constituted of a picture element matrix, which has a size of N columns×N rows and has its center at a picture element represented by an original image signal Dorg, in a two-dimensional array of picture elements, ii) calculating an unsharp mask signal Lu, which represents the mean value of the image signal values corresponding to the picture elements located within the unsharp mask, with Formula (5)

$$Lu = (\Sigma Dorg)/N^2 \qquad (5)$$

wherein ΣDorg represents the sum of the image signal values representing the picture elements located within the unsharp mask, and iii) carrying out a dynamic range compressing process by using a function f(Lu) in accordance with the obtained unsharp mask signal Lu, in which low frequency components have been emphasized, the dynamic range compressing process being carried out with Formula (1)

$$Dproc = Dorg + f(Lu) \qquad (1)$$

With the proposed method, the rate of compression of the dynamic range of the entire area of the image is changed in accordance with the unsharp mask signal Lu. Therefore, the dynamic range of the entire area of the image is compressed, and the contrast of fine image structures, which are located in each of image portions, such as portions having low levels of image density and portions having high levels of image density, and which contain comparatively high frequency components, can be kept high. Accordingly, portions of the image covering a wide range of image density can be used and can have good image quality in the reproduced visible image.

However, in cases where the rate of compression in the dynamic range compressing process is changed in accordance with the unsharp mask signal Lu, which is calculated with Formula (5), the problems occur in that, with respect to a region, in which the image density changes sharply, an artifact due to density blurring occurs in the image reproduced from the processed image signal Dproc obtained with Formula (1).

FIG. 3 is an explanatory view showing an X-ray image of an object containing an artificial bone. FIG. 4 is a graph showing signal value profiles taken along scanning line Y–Y' in the image of FIG. 3. Specifically, as for the X-ray image of the hip joint area shown in FIG. 3, the original image signal Dorg corresponding to the region (scanning

3 line Y–Y'), which extends across the edge of the artificial bone pattern, changes in the pattern indicated by the thick solid line in FIG. 4. Also, the unsharp mask signal Lu obtained with the unsharp mask constituted of a picture element matrix, which has a size of N columns×N rows, changes in the pattern indicated by the thin solid line in FIG. 4. In cases where the function f(Lu) is a function in accordance with the signal value as illustrated in, for example, FIG. 6, a difference of |f(a)–f(b)| occurs in the value of the function f(Lu) with respect to a certain picture element x, which is located in the vicinity of the artificial bone pattern, between when the function f(Lu) is set in accordance with the original image signal Dorg and when it is set in accordance with the unsharp mask signal Lu.

In the region, such as the region in the vicinity of the edge of the artificial bone pattern, at which the image density changes sharply, the difference occurs in the value of the function f, which determines the rate of compression of the dynamic range. In such cases, density blurring occurs in the vicinity of the edge in the image, which is reproduced from the processed image signal Dproc having been obtained from the dynamic range compressing process, and an artifact is thereby formed. Therefore, the image quality of the reproduced image cannot be kept high.

As disclosed in Japanese Unexamined Patent Publication No. 6(1994)-292013, the median value Dmed of the values of the image signal Dorg, which correspond to the picture elements located within the unsharp mask having been set in order to obtain the unsharp mask signal Lu, may be employed as the unsharp mask signal Lu. In such cases, the unsharp mask signal Lu has the profile indicated by the chained line Lu in FIG. 4, and the follow-up characteristics of the unsharp mask signal Lu with respect to the change in image density can be kept good. However, ordinarily, the unsharp mask is constituted of a picture element matrix having a size of at least 100×100 picture elements, and the number of the image signal values per unsharp mask becomes as large as at least $10^4$. Considerable time is required to calculate the median value Dmed of the large number of the image signal values.

SUMMARY OF THE INVENTION

The primary object of the present invention is to provide a method for compressing a dynamic range of an image, with which the range of image density of an image is compressed such that portions of the image covering a wide range of image density can be used and may have good image quality in the reproduced visible image, such that the image quality of fine image structures at each of portions having various levels of image density may be kept good, and such that the formation of an artifact at an edge, at which the image density changes sharply, may be restricted, a reproduced image with good image quality being thereby obtained.

Another object of the present invention is to provide an apparatus for carrying out the method for compressing a dynamic range of an image.

The present invention provides a first method for compressing a dynamic range of an image, comprising the steps of:

i) calculating an unsharp mask signal Lu, which corresponds to super-low frequency, from an original image signal Dorg representing an original image, ii) changing the rate of compression, at which the dynamic range of the original image is compressed, in accordance with the unsharp mask signal Lu, and

4 iii) carrying out a dynamic range compressing process with respect to each of picture elements in the original image, with the rate of compression being thus changed for each of the picture elements, the dynamic range compressing process being carried out with Formula (1)

$$Dproc = Dorg + f(Lu) \quad (1)$$

a processed image signal Dproc being thereby obtained, wherein the unsharp mask signal Lu represents the mean value of the image signal values of all picture elements located within a rectangular unsharp mask having shorter sides, which extend across an edge of a region of interest in the original image, and longer sides extending in the direction along which the edge extends.

In cases where the edge of the region of interest extends in an oblique direction, in lieu of the rectangular unsharp mask, a parallelogrammic unsharp mask having shorter sides, which extend across the edge of the region of interest, and longer sides extending in the direction, along which the edge extends, may be employed.

The present invention also provides a second method for compressing a dynamic range of an image, comprising the steps of:

i) calculating an unsharp mask signal Lu, which corresponds to super-low frequency, from an original image signal Dorg representing an original image, ii) changing the rate of compression, at which the dynamic range of the original image is compressed, in accordance with the unsharp mask signal Lu, and iii) carrying out a dynamic range compressing process with respect to each of picture elements in the original image, with the rate of compression being thus changed for each of the picture elements, the dynamic range compressing process being carried out with Formula (1)

$$Dproc = Dorg + f(Lu) \quad (1)$$

a processed image signal Dproc being thereby obtained, wherein the unsharp mask signal Lu represents the mean value calculated from only the image signal values, which are among the image signal values of all picture elements located within an unsharp mask, that is set in order to obtain the unsharp mask signal Lu, and the differences of which from the image signal value of a middle picture element in the unsharp mask are not larger than a predetermined threshold value.

Specifically, in the second method for compressing a dynamic range of an image in accordance with the present invention, only the image signal values [for example, $\{D_1, D_3, D_4, D_6, D_8, D_9, \text{and } D_{10}\}$], the differences of which from the image signal value $D_X$ of the middle picture element in the unsharp mask are not larger than a predetermined threshold value T, are selected from the image signal values $\{D_1, D_2, \ldots, D_{N2}\}$ of all picture elements located within the unsharp mask, that is set in order to obtain the unsharp mask signal Lu. The mean value $\{(D_1+D_3+D_4+D_6+D_8+D_9+D_{10})/7\}$ of the thus selected image signal values is taken as the unsharp mask signal Lu of the entire unsharp mask.

The present invention further provides a third method for compressing a dynamic range of an image, comprising the steps of:

i) calculating an unsharp mask signal Lu, which corresponds to super-low frequency, from an original image signal Dorg representing an original image, ii) changing the rate of compression, at which the dynamic range of the original image is compressed, in accordance with the unsharp mask signal Lu, and iii) carrying out a dynamic range compressing process with respect to each of picture elements in the original image, with the rate of compression being thus changed for each of the picture elements, the dynamic range compressing process being carried out with Formula (1)

$$Dproc=Dorg+f(Lu) \tag{1}$$

a processed image signal Dproc being thereby obtained, wherein as for the image signal values, which are among the image signal values of all picture elements located within an unsharp mask, that is set in order to obtain the unsharp mask signal Lu, and the differences of which from the image signal value of a middle picture element in the unsharp mask are not larger than a predetermined threshold value, the image signal values are used directly as the image signal values for the calculation of the unsharp mask signal Lu, as for the image signal values, which are among the image signal values of all picture elements located within the unsharp mask, and the differences of which from the image signal value of the middle picture element in the unsharp mask are larger than the predetermined threshold value, the predetermined threshold value is used as the image signal values for the calculation of the unsharp mask signal Lu, and the mean value calculated from the image signal values for the calculation of the unsharp mask signal Lu is taken as the value of the unsharp mask signal Lu.

Specifically, in the third method for compressing a dynamic range of an image in accordance with the present invention, as for the image signal values [for example, $\{D_1, D_3, D_4, D_6, D_8, D_9,$ and $D_{10}\}$], which are among the image signal values $\{D_1, D_2, \ldots, D_{N2}\}$ of all picture elements located within the unsharp mask, that is set in order to obtain the unsharp mask signal Lu, and the differences of which from the image signal value $D_x$ of the middle picture element in the unsharp mask are not larger than a predetermined threshold value T, the image signal values are used directly as the image signal values for the calculation of the unsharp mask signal Lu. As for the image signal values [for example, $\{D_2, D_5, D_7, D_{11}, \ldots, D_{N2}\}$], which are among the image signal values $\{D_1, D_2, \ldots, D_{N2}\}$ of all picture elements located within the unsharp mask, and the differences of which from the image signal value $D_x$ of the middle picture element in the unsharp mask are larger than the predetermined threshold value T, the predetermined threshold value T is used as the image signal values for the calculation of the unsharp mask signal Lu. The mean value $[\{(D_1+D_3+D_4+D_6+D_8+D_9+D_{10}) +T \cdot (N^2-7)\}/N^2]$ calculated from the image signal values for the calculation of the unsharp mask signal Lu is taken as the value of the unsharp mask signal Lu.

In the first, second, and third methods for compressing a dynamic range of an image in accordance with the present invention, the function f(Lu) in accordance with the unsharp mask signal Lu in Formula (1) may be a monotonously decreasing function, the value of which decreases monotonously as the value of the unsharp mask signal Lu increases.

The term "monotonously decreasing function" as used herein means a function such that, for example, the value of the function f(Lu) need not necessarily change for every increasing value of the unsharp mask signal Lu. For example, the monotonously decreasing function may contain a region, in which the value of the function f(Lu) does not change for a certain range of values of the unsharp mask signal Lu. This also applies to the method and apparatuses in accordance with the present invention, which will be described below.

The present invention still further provides a fourth method for compressing a dynamic range of an image, comprising the steps of:

i) carrying out a morphology operation on an original image signal Dorg, which represents an original image, the morphology operation being carried out with Formula (2) or Formula (3) by using a structure element Bi, which is larger than a spatial fluctuation range of image signal values corresponding to an image portion representing an unnecessary tissue or noise in the original image, and a scale factor λ, a morphology signal Dmor being obtained from the morphology operation, $$Dmor = Dorg - \max_{i=1,\ldots,n} \{(Dorg \ominus \lambda Bi) \oplus \lambda Bi\} \tag{2}$$

wherein the expression $X \ominus \lambda Y$ represents that λ times of calculations for finding the Minkowski difference are carried out with the structure element Y on the image signal X, and the expression $X \oplus \lambda Y$ represents that λ times of calculations for finding the Minkowski sum are carried out with the structure element Y on the image signal X, $$Dmor = Dorg - \min_{i=1,\ldots,n} \{(Dorg \oplus \lambda Bi) \ominus \lambda Bi\} \tag{3}$$

wherein the expression $X \oplus \lambda Y$ represents that λ times of calculations for finding the Minkowski sum are carried out with the structure element Y on the image signal X, and the expression $X \ominus \lambda Y$ represents that λ times of calculations for finding the Minkowski difference are carried out with the structure element Y on the image signal X, ii) changing the rate of compression, at which the dynamic range of the original image is compressed, in accordance with the morphology signal Dmor having been obtained from the morphology operation, and iii) carrying out a dynamic range compressing process with respect to each of picture elements in the original image, with the rate of compression being thus changed for each of the picture elements, the dynamic range compressing process being carried out with Formula (4)

$$Dproc=Dorg+f(Dmor) \tag{4}$$

a processed image signal Dproc being thereby obtained.

How the morphology operation is carried out will be described hereinbelow.

The morphology operation (also referred to as the morphology processing) is the processing based upon the algorithm of morphology for selectively extracting only an image portion, which has a specific shape, from an image. The morphology processing has been studied as a technique efficient for detecting, particularly, a small calcified pattern, which is one of characteristic forms of mammary cancers. However, the image to be processed with the morphology processing is not limited to the small calcified pattern in a mammogram, and the morphology processing is applicable to any kind of image, in which the size and the shape of a specific image portion (i.e., an abnormal pattern, or the like) to be detected are known previously.

How the morphology processing is carried out will be described hereinbelow by taking the detection of a small calcified pattern in a mammogram as an example.

(Fundamental operation of morphology processing)

In general, the morphology processing is expanded as the theory of sets in an N-dimensional space. As an aid in facilitating the intuitive understanding, the morphology processing will be described hereinbelow with reference to a two-dimensional gray level image.

The gray level image is considered as a space, in which a point having coordinates (x, y) has a height corresponding to a density value f(x, y). In this case, it is assumed that the image signal representing the density value f(x, y) is a high luminance-high signal level type of image signal, in which a low density (i.e., a high luminance when the image is displayed on a CRT display device) is represented by a high image signal level.

Firstly, as an aid in facilitating the explanation, a one-dimensional function f(x) corresponding to the cross section of the two-dimensional gray level image is considered. It is assumed that structure element g used in the morphology operation is a symmetric function of Formula (6), which is symmetric with respect to the origin.

$$g^s(x)=g(-x) \quad (6)$$

It is also assumed that the value is 0 in a domain of definition G, which is represented by Formula (7).

$$G=\{-m, -m+1, \ldots, -1, 0, 1, \ldots, m-1, m\} \quad (7)$$

In such cases, the fundamental forms of the morphology operation are very simple operations carried out with Formulas (8), (9), (10), and (11).

$$\text{dilation; } [f \oplus G^s](i) = \max\{f(i-m), \ldots, f(i), \ldots, f(i+m)\} \quad (8)$$

$$\text{erosion; } [f \ominus G^s](i) = \min\{f(i-m), \ldots, f(i), \ldots, f(i+m)\} \quad (9)$$

$$\text{opening; } f^B = (f \ominus g^s) \oplus g \quad (10)$$

$$\text{closing; } f^B = (f \oplus g^s) \ominus g \quad (11)$$

Specifically, as illustrated in FIG. 8A, the dilation processing is the processing for retrieving the maximum value in the range of a width of ±m (which is the value determined in accordance with a structure element B) having its center at a picture element of interest. As illustrated in FIG. 8B, the erosion processing is the processing for retrieving the minimum value in the range of the width of ±m having its center at the picture element of interest.

The opening processing is equivalent to the processing in which the maximum value is searched after the searching of the minimum value. Also, the closing processing is equivalent to the processing in which the minimum value is searched after the searching of the maximum value. More specifically, as illustrated in FIG. 8C, the opening processing is equivalent to the processing for smoothing the density curve f(x) from the low luminance side, and removing a convex density fluctuating portion (i.e., the portion at which the luminance is higher than that of the surrounding portions), which fluctuates in a range spatially narrower than the mask size of 2m. Also, as illustrated in FIG. 8D, the closing processing is equivalent to the processing for smoothing the density curve f(x) from the high luminance side, and removing a concave density fluctuating portion (i.e., the portion at which the luminance is lower than that of the surrounding portions), which fluctuates in the range spatially narrower than the mask size of 2m.

In cases where the structure element g is not symmetric with respect to the origin, the dilation operation with Formula (8) is referred to as the Minkowski sum, and the erosion operation with Formula (9) is referred to as the Minkowski difference.

In cases where the image signal representing the density value f(x) is a high density-high signal level type of image signal, in which a high density is represented by a high image signal level, the relationship between the density value f(x) and the image signal value becomes reverse to the relationship between the density value f(x) and the image signal value in the high luminance-high image signal level type of image signal. Therefore, the dilation processing, which is carried out on the high density-high signal level type of image signal, coincides with the erosion processing, which is carried out on the high luminance-high signal level type of image signal as shown in FIG. 8B. The erosion processing, which is carried out on the high density-high signal level type of image signal, coincides with the dilation processing, which is carried out on the high luminance-high signal level type of image signal as shown in FIG. 8A. The opening processing, which is carried out on the high density-high signal level type of image signal, coincides with the closing processing, which is carried out on the high luminance-high signal level type of image signal as shown in FIG. 8D. Also, the closing processing, which is carried out on the high density-high signal level type of image signal, coincides with the opening processing, which is carried out on the high luminance-high signal level type of image signal as shown in FIG. 8C.

The morphology processing is herein described with respect to the high luminance-high signal level type of image signal.

(Application to detection of calcified patterns)

In order for a calcified pattern to be detected, it is considered to employ a difference method, in which a smoothed image signal is subtracted from the original image signal. However, with a simple smoothing method, it is difficult to discriminate the calcified pattern from an elongated non-calcified pattern (for example, a pattern of the mammary gland, a blood vessel, mammary gland supporting tissues, or the like). Therefore, Obata of Tokyo University of Agriculture and Technology, et al. have proposed a morphology filter, which is represented by Formula (12) and is based upon the opening operation using a multiply structure element. [Reference should be made to, for example, "Extraction of Small Calcified Patterns with A Morphology Filter Using A Multiply Structure Element," Collected Papers of The Institute of Electronics and Communication Engineers of Japan, D-II, Vol. J75-D-II, No. 7, pp. 1170–1176, July 1992.]

$$P = \underset{i \in (1, \ldots, M)}{f\text{-max}} \{(f \ominus Bi) \oplus Bi\} \quad (12)$$

$$= \underset{i \in (1, \ldots, M)}{f\text{-max}} \{f_{Bi}\}$$

In Formula (12), Bi (wherein i=1, 2, ..., M) represents M number of linear structure elements (M=4 in the example shown in FIG. 9). (The M number of structure elements, as a whole, will hereinbelow be referred to as the multiply structure element. Also, the multiply structure element will often be simply referred to as the structure element, including the cases where i=1.) In cases where the structure element Bi is set to be larger than the calcified pattern to be detected, a calcified pattern, which is a convex signal change portion finer than the structure element Bi (i.e., which is an image portion fluctuating in a spatially narrow range) and has luminance values larger than the luminance values of the surrounding portions, is removed in the opening processing. On the other hand, an elongated non-calcified pattern is longer than the structure element Bi. Therefore, in cases where the inclination of the non-calcified pattern (i.e. the direction along which the non-calcified pattern extends) coincides with one of the directions of the four structure elements Bi, the non-calcified pattern remains unremoved after the opening processing, i.e. the operation of the second term of Formula (12), has been carried out. Therefore, when the smoothed image signal obtained from the opening processing (i.e. the signal representing the image, from which only the calcified pattern has been removed) is subtracted from the original image signal f, an image can be obtained which contains only the small calcified pattern. This is the concept behind Formula (12).

As described above, in cases where the image signal is of the high density-high signal level type, the density value of the calcified pattern is smaller than the density values of the surrounding image portions, and the calcified pattern constitutes a concave signal change portion with respect to the surrounding portions. Therefore, the closing processing is applied in lieu of the opening processing, and Formula (13) is applied in lieu of Formula (12).

$$P = \underset{i \in (1, \ldots, M)}{f\text{-min}} \{(f \oplus Bi) \ominus Bi\} \tag{13}$$

$$= \underset{i \in (1, \ldots, M)}{f\text{-min}} \{f^{Bi}\}$$

The morphology processing has the features in that, for example, (1) it is efficient for extracting a calcified pattern itself, (2) it is not affected by complicated background information, and (3) the extracted calcified pattern does not become distorted. Specifically, the morphology processing is advantageous over ordinary differentiation processing in that it can more accurately detect the geometrical information concerning the size, the shape, and the density distribution of the calcified pattern.

The scale factor λ represents the number of the operations for finding the Minkowski sum and the operations for finding the Minkowski difference. As the number of the operations becomes large, the extent of smoothing becomes higher.

In the fourth method for compressing a dynamic range of an image in accordance with the present invention, the function f(Dmor) in accordance with the morphology signal Dmor in Formula (4) may be a monotonously decreasing function, the value of which decreases monotonously as the value of the morphology signal Dmor increases.

The present invention also provides a first apparatus for compressing a dynamic range of an image, comprising:

i) an unsharp mask signal calculating means for calculating an unsharp mask signal Lu, which corresponds to super-low frequency, from an original image signal Dorg representing a n original image, ii) a compression rate determining function storage means for storing information about a function representing the rate of compression f(Lu), at which the dynamic range of the original image is compressed, the unsharp mask signal Lu, which has been obtained from the unsharp mask signal calculating means, serving as a variable in the function, and iii) a dynamic range compressing operation means for carrying out a dynamic range compressing process with respect to each of picture elements in the original image, by using the rate of compression f(Lu) for each of the picture elements, which rate of compression is obtained in accordance with the function stored in the compression rate determining function storage means, the dynamic range compressing process being carried out with Formula (1)

$$Dproc = Dorg + f(Lu) \tag{1}$$

a processed image signal Dproc being thereby obtained, wherein the unsharp mask signal calculating means calculates, as the unsharp mask signal Lu, the mean value of the image signal values of all picture elements located within a rectangular unsharp mask having shorter sides, which extend across an edge of the region of interest in the original image, and longer sides extending in the direction along which the edge extends.

The present invention further provides a second apparatus for compressing a dynamic range of an image, comprising:

i) an unsharp mask signal calculating means for calculating an unsharp mask signal Lu, which corresponds to super-low frequency, from an original image signal Dorg representing an original image, ii) a compression rate determining function storage means for storing information about a function representing the rate of compression f(Lu), at which the dynamic range of the original image is compressed, the unsharp mask signal Lu, which has been obtained from the unsharp mask signal calculating means, serving as a variable in the function, and iii) a dynamic range compressing operation means for carrying out a dynamic range compressing process with respect to each of picture elements in the original image, by using the rate of compression f(Lu) for each of the picture elements, which rate of compression is obtained in accordance with the function stored in the compression rate -determining function storage means, the dynamic range compressing process being carried out with Formula (1)

$$Dproc = Dorg + f(Lu) \tag{1}$$

a processed image signal Dproc being thereby obtained, wherein the unsharp mask signal calculating means calculates, as the unsharp mask signal Lu, the mean value calculated from only the image signal values, which are among the image signal values of all picture elements located within an unsharp mask, that is set in order to obtain the unsharp mask signal Lu, and the differences of which from the image signal value of a middle picture element in the unsharp mask are not larger than a predetermined threshold value.

The present invention still further provides a third apparatus for compressing a dynamic range of an image, comprising:

i) an unsharp mask signal calculating means for calculating an unsharp mask signal Lu, which corresponds to super-low frequency, from an original image signal Dorg representing an original image, ii) a compression rate determining function storage means for storing information about a function representing the rate of compression f(Lu), at which the dynamic range of the original image is compressed, the unsharp mask signal Lu, which has been obtained from the unsharp mask signal calculating means, serving as a variable in the function, and iii) a dynamic range compressing operation means for carrying out a dynamic range compressing process with respect to each of picture elements in the original image, by using the rate of compression f(Lu) for each of the picture elements, which rate of compression is obtained in accordance with the function stored in the compression rate determining function storage means, the dynamic range compressing process being carried out with Formula (1)

$$Dproc=Dorg+f(Lu) \tag{1}$$

a processed image signal Dproc being thereby obtained, wherein as for the image signal values, which are among the image signal values of all picture elements located within an unsharp mask, that is set in order to obtain the unsharp mask signal Lu, and the differences of which from the image signal value of a middle picture element in the unsharp mask are not larger than a predetermined threshold value, the image signal values are used directly as the image signal values for the calculation of the unsharp mask signal Lu, as for the image signal values, which are among the image signal values of all picture elements located within the unsharp mask, and the differences of which from the image signal value of the middle picture element in the unsharp mask are larger than the predetermined threshold value, the predetermined threshold value is used as the image signal values for the calculation of the unsharp mask signal Lu, and the unsharp mask signal calculating means calculates, as the unsharp mask signal Lu, the mean value calculated from the image signal values for the calculation of the unsharp mask signal Lu.

In the first, second, and third apparatuses for compressing a dynamic range of an image in accordance with the present invention, the function f(Lu) in accordance with the unsharp mask signal Lu in Formula (1) may be a monotonously decreasing function, the value of which decreases monotonously as the value of the unsharp mask signal Lu increases.

The present invention also provides a fourth apparatus for compressing a dynamic range of an image, comprising:

i) a morphology signal operation means for carrying out a morphology operation on an original image signal Dorg, which represents an original image, the morphology operation being carried out with Formula (2) or Formula (3) by using a structure element Bi, which is larger than a spatial fluctuation range of image signal values corresponding to an image portion representing an unnecessary tissue or noise in the original image, and a scale factor λ, a morphology signal Dmor, which is represented by Formula (2) or Formula (3), being obtained from the morphology signal operation means, $$Dmor = Dorg - \max_{i=1,\ldots,n} \{(Dorg \ominus \lambda Bi) \oplus \lambda Bi\} \tag{2}$$

wherein the expression $X \ominus \lambda Y$ represents that λ times of calculations for finding the Minkowski difference are carried out with the structure element Y on the image signal X, and the expression $X \oplus \lambda Y$ represents that λ times of calculations for finding the Minkowski sum are carried out with the structure element Y on the image signal X, $$Dmor = Dorg - \min_{i=1,\ldots,n} \{(Dorg \oplus \lambda Bi) \ominus \lambda Bi\} \tag{3}$$

wherein the expression $X \oplus \lambda Y$ represents that λ times of calculations for finding the Minkowski sum are carried out with the structure element Y on the image signal X, and the expression $X \ominus \lambda Y$ represents that λ times of calculations for finding the Minkowski difference are carried out with the structure element Y on the image signal X, ii) a compression rate determining function storage means for storing information about a function representing the rate of compression f(Dmor), at which the dynamic range of the original image is compressed, the morphology signal Dmor, which has been obtained from the morphology signal operation means, serving as a variable in the function, and iii) a dynamic range compressing operation means for carrying out a dynamic range compressing process with respect to each of picture elements in the original image, by using the rate of compression f(Dmor) for each of the picture elements, which rate of compression is obtained in accordance with the function stored in the compression rate determining function storage means, the dynamic range compressing process being carried out with Formula (4)

$$Dproc=Dorg+f(Dmor) \tag{4}$$

a processed image signal Dproc being thereby obtained.

In the fourth apparatus for compressing a dynamic range of an image in accordance with the present invention, the function f(Dmor) in accordance with the morphology signal Dmor in Formula (4) may be a monotonously decreasing function, the value of which decreases monotonously as the value of the morphology signal Dmor increases.

With the first method and apparatus for compressing a dynamic range of an image in accordance with the present invention, a calculation is made to find the unsharp mask signal Lu, in which the low frequency components of the original image signal Dorg have been emphasized. Thereafter, the dynamic range compressing process is carried out by using the function f(Lu), which is in accordance with the unsharp mask signal Lu. The dynamic range compressing process is carried out with Formula (1)

$$Dproc=Dorg+f(Lu) \tag{1}$$

and the processed image signal Dproc is thereby obtained. Therefore, the dynamic range of the entire area of the image can be compressed. Also, the contrast of fine image structures, which have many comparatively high frequency components and are located at each of portions having various levels of image density, can be kept high. Accordingly, portions of the image covering a wide range of image density can be used and can have good image quality in the reproduced visible image.

Also, as the unsharp mask signal Lu, the mean value of the image signal values of all picture elements located within the rectangular unsharp mask is employed. The rectangular unsharp mask has shorter sides, which extend across the edge of the region of interest in the original image, and longer sides extending in the direction along which the edge extends. Therefore, the degree, with which the unsharp mask signal Lu depends upon the density in the direction extending across the image edge, becomes higher than when a square unsharp mask is used. As a result, as indicated by the chained line Lu in FIG. 4, the follow-up characteristics of the unsharp mask signal Lu with respect to the sharp change in density can be kept good.

Accordingly, the function f(Lu) in Formula (1), which function determines the rate of compression of the dynamic range and is set in accordance with the unsharp mask signal Lu, take values close to the values of the function f(Lu), which is set in accordance with the original image signal Dorg. As a result, the occurrence of the density blurring in the vicinity of the image edge in the reproduced image can be reduced, and the formation of an artifact can be restricted.

With the second method and apparatus for compressing a dynamic range of an image in accordance with the present invention, a calculation is made to find the unsharp mask signal Lu, in which the low frequency components of the original image signal Dorg have been emphasized. Thereafter, the dynamic range compressing process is carried out by using the function f(Lu), which is in accordance with the unsharp mask signal Lu. The dynamic range compressing process is carried out with Formula (1), and the processed image signal Dproc is thereby obtained. Therefore, the dynamic range of the entire area of the image can be compressed. Also, the contrast of fine image structures, which have many comparatively high frequency components and are located at each of portions having various levels of image density, can be kept high. Accordingly, portions of the image covering a wide range of image density can be used and can have good image quality in the reproduced visible image.

Also, as the unsharp mask signal Lu, the mean value calculated from only the image signal values, which are among the image signal values of all picture elements located within the unsharp mask, and the differences of which from the image signal value of the middle picture element in the unsharp mask are not larger than the predetermined threshold value, is employed. Therefore, the change in the unsharp mask signal Lu can appropriately follow the change in the density.

Specifically, as in the first method for compressing a dynamic range of an image in accordance with the present invention, the unsharp mask signal Lu takes values close to the thick solid line Dorg shown in FIG. 4.

Accordingly, the function f(Lu) in Formula (1), which function determines the rate of compression of the dynamic range and is set in accordance with the unsharp mask signal Lu, take values close to the values of the function f(Lu), which is set in accordance with the original image signal Dorg. As a result, the occurrence of the density blurring in the vicinity of the image edge in the reproduced image can be reduced, and the formation of an artifact can be restricted.

With the third method and apparatus for compressing a dynamic range of an image in accordance with the present invention, a calculation is made to find the unsharp mask signal Lu, in which the low frequency components of the original image signal Dorg have been emphasized. Thereafter, the dynamic range compressing process is carried out by using the function f(Lu), which is in accordance with the unsharp mask signal Lu. The dynamic range compressing process is carried out with Formula (1), and the processed image signal Dproc is thereby obtained. Therefore, the dynamic range of the entire area of the image can be compressed. Also, the contrast of fine image structures, which have many comparatively high frequency components and are located at each of portions having various levels of image density, can be kept high. Accordingly, portions of the image covering a wide range of image density can be used and can have good image quality in the reproduced visible image.

Also, as for the image signal values, which are among the image signal values of all picture elements located within the unsharp mask, and the differences of which from the image signal value of a middle picture element in the unsharp mask are not larger than the predetermined threshold value, the image signal values are used directly as the image signal values for the calculation of the unsharp mask signal Lu. As for the image signal values, which are among the image signal values of all picture elements located within the unsharp mask, and the differences of which from the image signal value of the middle picture element in the unsharp mask are larger than the predetermined threshold value, the predetermined threshold value is used as the image signal values for the calculation of the unsharp mask signal Lu. The mean value calculated from the image signal values for the calculation of the unsharp mask signal Lu is taken as the value of the unsharp mask signal Lu. Therefore, the change in the unsharp mask signal Lu can appropriately follow the change in the density.

Specifically, as in the first method for compressing a dynamic range of an image in accordance with the present invention, the unsharp mask signal Lu takes values close to the thick solid line Dorg shown in FIG. 4.

Accordingly, the function f(Lu) in Formula (1), which function determines the rate of compression of the dynamic range and is set in accordance with the unsharp mask signal Lu, take values close to the values of the function f(Lu), which is set in accordance with the original image signal Dorg. As a result, the occurrence of the density blurring in the vicinity of the image edge in the reproduced image can be reduced, and the formation of an artifact can be restricted.

With the fourth method and apparatus for compressing a dynamic range of an image in accordance with the present invention, the morphology operation is carried out on the original image signal Dorg, which represents an original image. The morphology operation is carried out with Formula (2) or Formula (3) by using the structure element Bi, which is larger than a spatial fluctuation range of image signal values corresponding to an image portion representing an unnecessary tissue or noise in the original image, and a scale factor $\lambda$. The morphology signal Dmor is obtained from the morphology operation. Thereafter, the dynamic range compressing process is carried out by using the function f(Dmor), which is in accordance with the morphology signal Dmor. The dynamic range compressing process is carried out with Formula (4), and the processed image signal Dproc is thereby obtained. Therefore, the dynamic range of the entire area of the image can be compressed. Also, the contrast of fine image structures, which have many comparatively high frequency components and are located at each of portions having various levels of image density, can be kept high. Accordingly, portions of the image covering a wide range of image density can be used and can have good image quality in the reproduced visible image.

Also, with the fourth method for compressing a dynamic range of an image in accordance with the present invention, the image edge, at which the density changes sharply, can be kept approximately perfectly. Therefore, the function f(Dmor), which determines the rate of compression of the dynamic range in Formula (4) and in which the morphology signal Dmor is utilized as the unsharp mask signal Lu, take values close to the values of the function f(Dmor), which is set in accordance with the original image signal Dorg. As a result, the occurrence of the density blurring in the vicinity of the image edge in the reproduced image can be reduced, and the formation of an artifact can be restricted.

BRIEF DESCRIPTION OF THE DRAWINGS

FIG. 1 is a schematic view showing an example of an X-ray image recording apparatus, FIG. 2 is a perspective view showing an example of an X-ray image read-out apparatus, in which an embodiment of the apparatus for carrying out the method for compressing a dynamic range of an image in accordance with the present invention is employed.

DESCRIPTION OF THE PREFERRED EMBODIMENTS

The present invention will hereinbelow be described in further detail with reference to the accompanying drawings.

In the embodiments described below, by way of example, an X-ray image is stored on a stimulable phosphor sheet.

Figure 3:
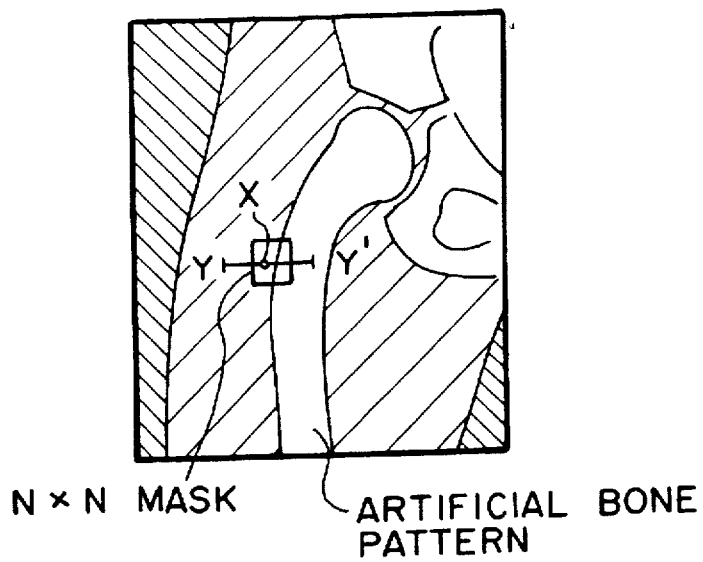
FIG. 3 is an explanatory view showing an X-ray image of an object containing an artificial bone.
Figure 4:
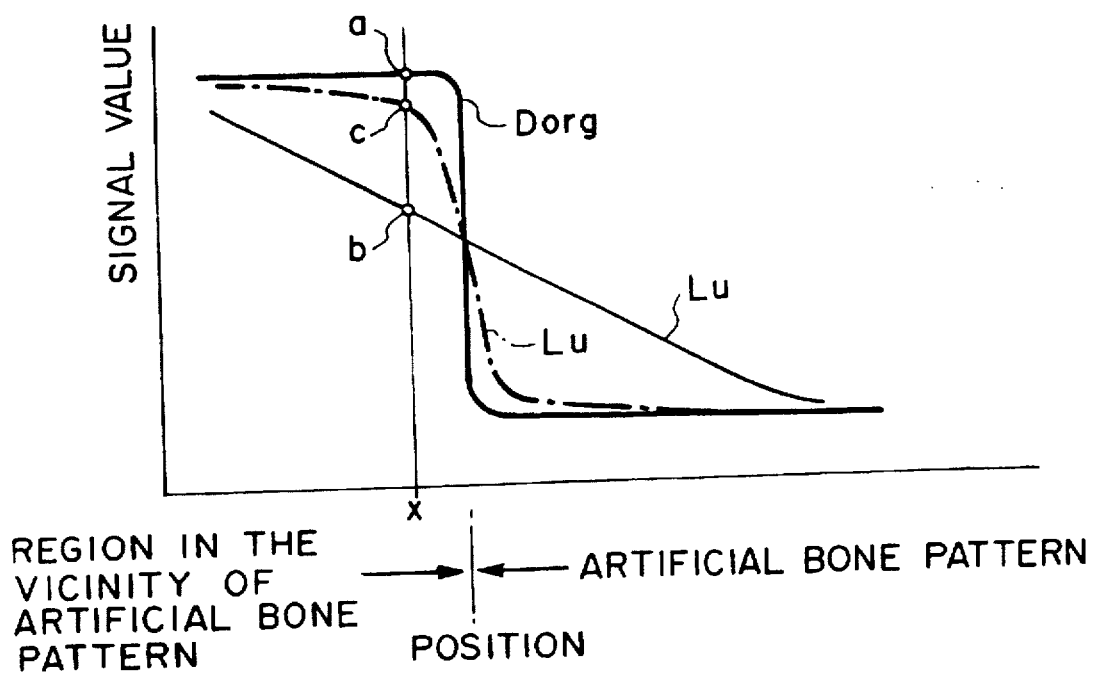
FIG. 4 is a graph showing signal value profiles taken along scanning line Y-Y' in the image of FIG. 3.

FIG. 1 is a schematic view showing an example of an X-ray image recording apparatus. FIG. 2 is a perspective view showing an example of an X-ray image read-out apparatus, in which an embodiment of the apparatus for carrying out the method for compressing a dynamic range of an image in accordance with the present invention is employed. FIG. 3 is an explanatory view showing an X-ray image, which has been recorded with the X-ray image recording apparatus shown in FIG. 1 and contains an artificial bone pattern. FIG. 4 is a graph showing signal value profiles taken along scanning line Y-Y' in the vicinity of the artificial bone pattern in the image of FIG. 3.

With reference to FIG. 1, X-rays 12 are produced by an X-ray source 11 of an X-ray image recording apparatus 10 and irradiated to an object 13. The X-rays, which have passed through the object 13, impinge upon a stimulable phosphor sheet 14. In this manner, an X-ray image of the object 13 is stored on the stimulable phosphor sheet 14.

With reference to FIG. 2, the stimulable phosphor sheet 14, on which the X-ray image has been stored by the X-ray image recording apparatus 10 shown in FIG. 1, is placed at a predetermined position in a read-out means 20 of an X-ray image read-out apparatus.

The stimulable phosphor sheet 14 is then conveyed in a sub-scanning direction, which is indicated by the arrow Y, by an endless belt 22, which is operated by a motor 21. A laser beam 24, which serves as stimulating rays, is produced by a laser beam source 23. The laser beam 24 is reflected and deflected by a rotating polygon mirror 26, which is quickly rotated by a motor 25 in the direction indicated by the arrow. The laser beam 24 then passes through a converging lens 27, which may be constituted of an f θ lens, or the like. The direction of the optical path of the laser beam 24 is then changed by a mirror 28, and the laser beam 24 impinges upon the stimulable phosphor sheet 14 and scans it in a main scanning direction indicated by the arrow X, which direction is approximately normal to the sub-scanning direction indicated by the arrow Y. When the stimulable phosphor sheet 14 is exposed to the laser beam 24, the exposed portion of the stimulable phosphor sheet 14 emits light 29 in an amount proportional to the amount of energy stored thereon during its exposure to the X-rays. The emitted light 29 is guided by a light guide member 30 and photoelectrically detected by a photomultiplier 31.

The light guide member 30 is made from a light guiding material, such as an acrylic plate. The light guide member 30 has a linear light input face 30a, which is positioned so that it extends along the main scanning line on the stimulable phosphor sheet 14, and a ring-shaped light output face 30b, which is positioned so that it is in close contact with a light receiving face of the photomultiplier 31. The emitted light 29, which has entered the light guide member 30 at its light input face 30a, is guided through repeated total reflection inside of the light guide member 30, emanates from the light output face 30b, and is received by the photomultiplier 31. In this manner, the amount of the emitted light 29, which amount represents the X-ray image, is converted into an electric signal by the photomultiplier 31.

An analog output signal S is generated by the photomultiplier 31. The analog output signal S is logarithmically amplified by a logarithmic amplifier 32, and digitized by an analog-to-digital converter 33. In this manner, an original image signal Dorg is obtained. The original image signal Dorg is then stored in an internal memory of an image processing and displaying means 40.

The image processing and displaying means 40 is provided with an embodiment of the apparatus for carrying out the method for compressing a dynamic range of an image (hereinafter referred to as the dynamic range compressing apparatus) in accordance with the present invention. The image processing and displaying means 40 is constituted of a CRT display device 41 which reproduces and displays a visible image, a main body 42 in which a CPU, the internal memory, an interface, or the like, are incorporated, a floppy disk drive unit 43 which operates a floppy disk, and a keyboard 44 from which necessary information is fed into the X-ray image read-out apparatus.

Figure 5:
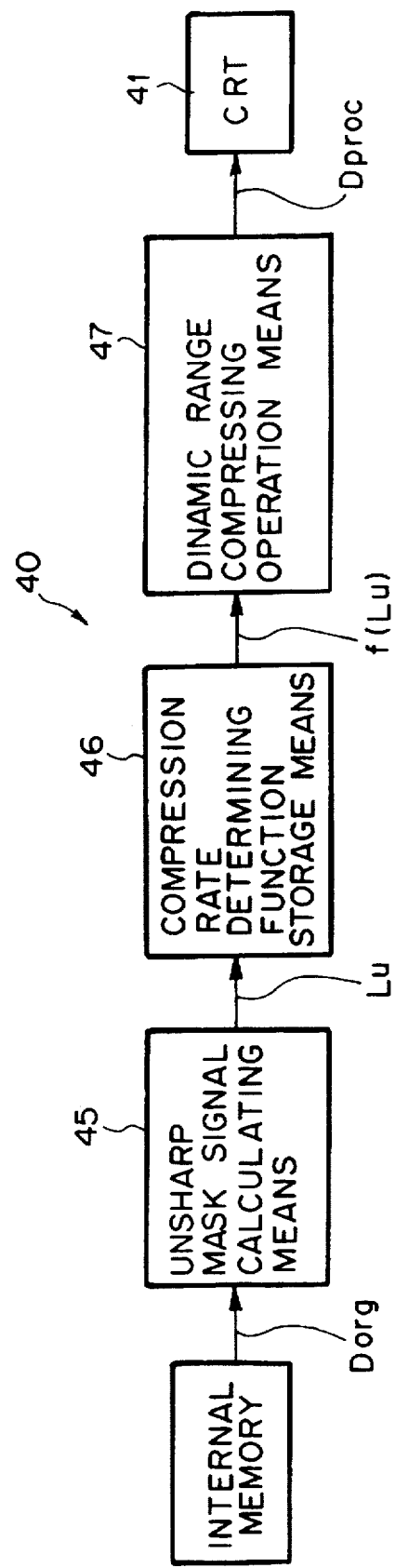
FIG. 5 is a block diagram showing the embodiment of the apparatus for compressing a dynamic range of an image in accordance with the present invention.

As illustrated in FIG. 5, the dynamic range compressing apparatus is provided with an unsharp mask signal calculating means 45, a compression rate determining function storage means 46, and a dynamic range compressing operation means 47. The unsharp mask signal calculating means 45 sets a vertically long unsharp mask having shorter sides, which extend across an edge of the region of interest (for example, an artificial bone pattern) in the image, and longer sides extending in the direction along which the edge extends. The vertically long unsharp mask has its center at the picture element represented by the original image signal Dorg stored in the internal memory. For example, the unsharp mask may be constituted of a picture element matrix, which has a size of 21 columns×127 rows and has its center at the picture element represented by the original image signal Dorg. in the two-dimensional array of picture elements. The unsharp mask signal calculating means 45 thus calculates an unsharp mask signal Lu, which represents the mean value |=ΣΣDorg/(21×127)| of the image signal values corresponding to the picture elements located within the unsharp mask.

Figure 6:
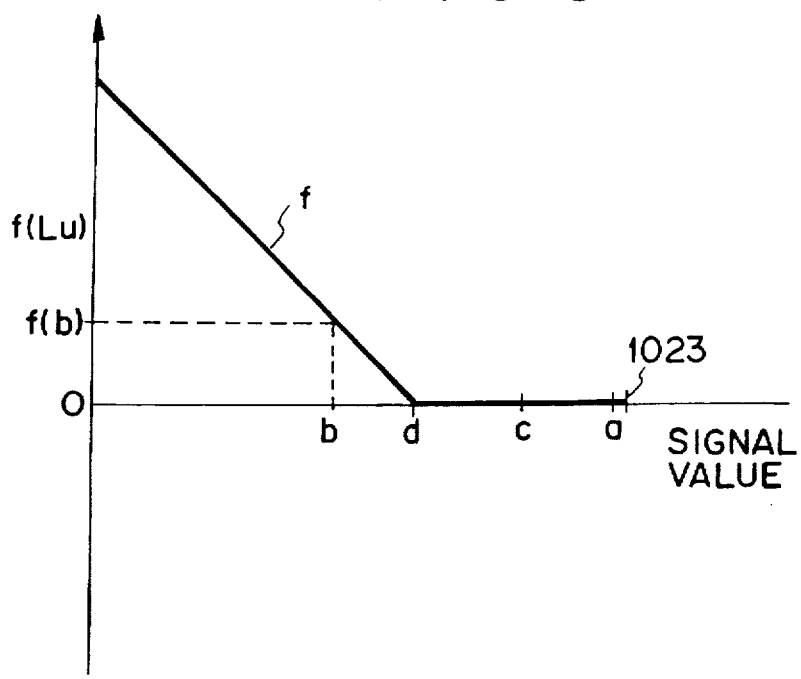
FIG. 6 is a graph showing an example of a conversion table of a function f(Lu), which determines the rate of compression of a dynamic range and depends upon an image signal.

The compression rate determining function storage means 46 stores information about a function f(Lu), which determines the rate of compression of the dynamic range and is shown in FIG. 6. In the function f(Lu), the unsharp mask signal Lu, which has been obtained from the unsharp mask signal calculating means 45, serves as a variable.

The dynamic range compressing operation means 47 carries out a dynamic range compressing process with respect to each of picture elements in the original image, by using the rate of compression f(Lu) for each of the picture elements, which rate of compression is obtained in accordance with the function stored in the compression rate determining function storage means 46. The dynamic range compressing process is carried out with Formula (1)

$$Dproc=Dorg+f(Lu) \qquad (1)$$

A processed image signal Dproc is thereby obtained from the dynamic range compressing process.

The function f(Lu), which determines the rate of compression of the dynamic range and is shown in FIG. 6, is a monotonously decreasing function, the value of which decreases monotonously as the value of the unsharp mask signal Lu ($0 \leq Lu \leq 1,023$) increases. The function f(Lu) is inclined along a straight line with respect to a region up to a point d ($Lu \leq d$). Also, the function f(Lu) takes a fixed number of zero with respect to the region larger than the point d ($d < Lu$).

The original image signal Dorg, which has been stored in the internal memory of the image processing and displaying means 40, is read from the internal memory and fed into the unsharp mask signal calculating means 45. The unsharp mask signal calculating means 45 calculates the unsharp mask signal Lu, in which the low frequency components of the original image signal Dorg have been emphasized.

The unsharp mask signal Lu is fed into the compression rate determining function storage means 46. The compression rate determining function storage means 46 calculates the rate of compression f(Lu) in Formula (1) by using the conversion table shown in FIG. 6, which determines the rate of compression of the dynamic range and has been stored in the compression rate determining function storage means 46.

The information representing the calculated rate of compression f(Lu) is fed into the dynamic range compressing operation means 47. The dynamic range compressing operation means 47 carries out the dynamic range compressing process with Formula (1). With the dynamic range compressing process, the dynamic range in the region, in which the value of the unsharp mask signal Lu is small, i.e. in the region of the artificial bone pattern shown in FIG. 4, in which the mean image density is low, is compressed. Also, the contrast of fine image structures, which are constituted of comparatively high frequency components and are located in each of image portions including the artificial bone pattern, is kept in the state prior to the compression. Therefore, when a visible image is reproduced from the processed image signal Dproc on the CRT display device 41, a visible image can be obtained, in which the dynamic range of the low density region has been compressed, while the contrast of the fine image structures in the low density region is being kept good.

As described above, with this embodiment of the dynamic range compressing apparatus, the dynamic range of the entire area of the image can be compressed. Also, the contrast of the fine image structures, which have many comparatively high frequency components and are located at each of portions having various levels of image density, can be kept high. Accordingly, portions of the image covering a wide range of image density can be used and can have good image quality in the reproduced visible image.

Further, as the unsharp mask signal Lu, according to which the function f for determining the rate of compression is set, the mean value of the values of the image signal Dorg of all picture elements located within the vertically long, rectangular unsharp mask is employed. The rectangular unsharp mask has shorter sides, which extend across the edge of the region of interest in the X-ray image (i.e., the vertically extending edge of the artificial bone pattern, at which the image density changes sharply), and longer sides extending in the direction along which the edge extends. Therefore, the degree, with which the unsharp mask signal Lu (indicated by the chained line Lu in FIG. 4) depends upon the density change of the original image signal (indicated by the thick solid line Dorg in FIG. 4) in the direction extending across the edge of the artificial bone pattern, becomes higher than when a square unsharp mask is used (as indicated by the thin solid line Lu in FIG. 4). As a result, the follow-up characteristics of the unsharp mask signal Lu with respect to the sharp change in image density can be kept good.

Accordingly, the function f(Lu) in Formula (1), which function determines the rate of compression of the dynamic range and is set in accordance with the unsharp mask signal Lu, take values close to (in this embodiment, the same values as) the values of the function f(Lu), which is set in accordance with the original image signal Dorg. As a result, the occurrence of the density blurring in the vicinity of the image edge in the reproduced image (obtained with the dynamic range compressing process) can be reduced, and the formation of an artifact can be restricted.

Figure 7:
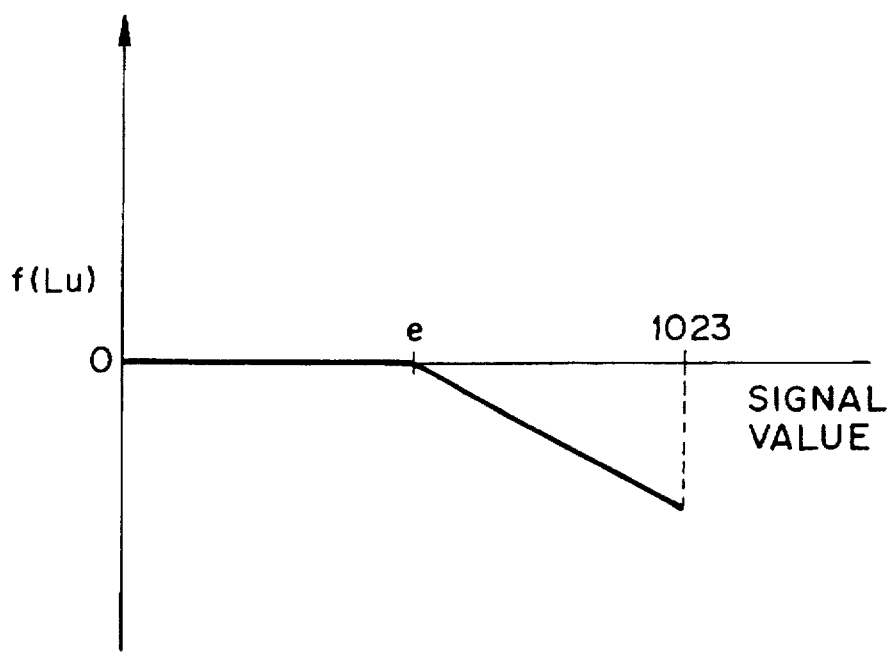
FIG. 7 is a graph showing a different example of a function f(Lu), which determines the rate of compression of a dynamic range.
Figure 8A:
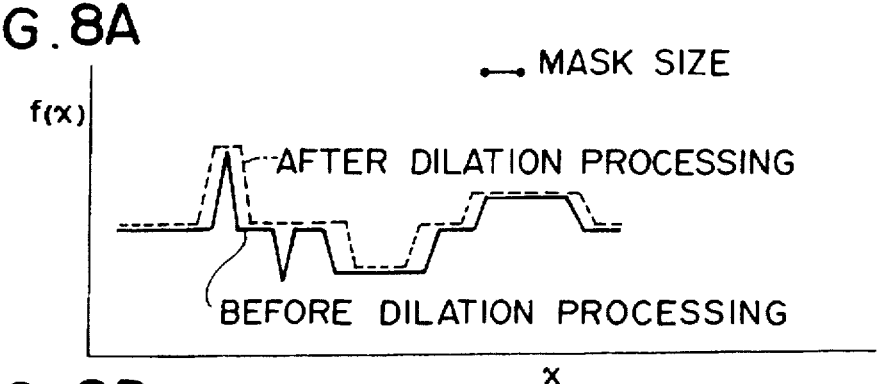
FIG. 8A is a graph showing how a dilation processing, which is one of fundamental morphology operations, is carried out.
Figure 8B:
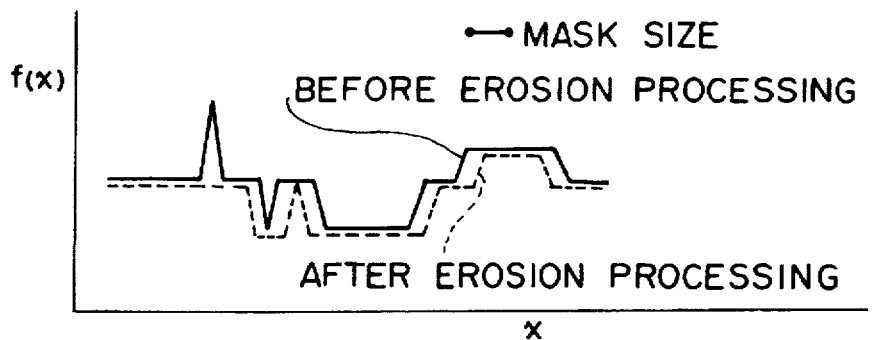
FIG. 8B is a graph showing how an erosion processing, which is one of fundamental morphology operations, is carried out.
Figure 8C:
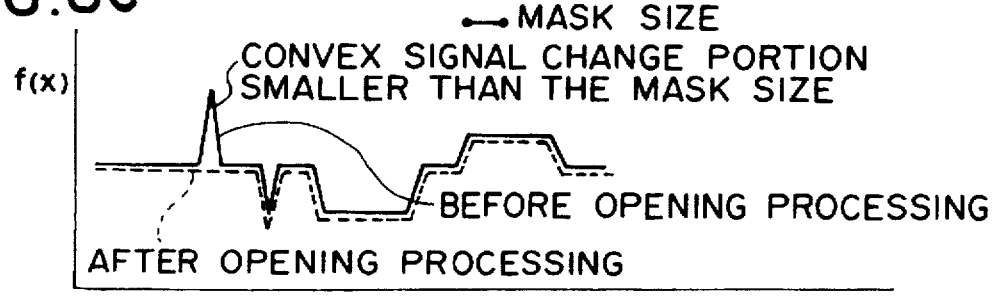
FIG. 8C is a graph showing how an opening processing, which is one of fundamental morphology operations, is carried out.
Figure 8D:
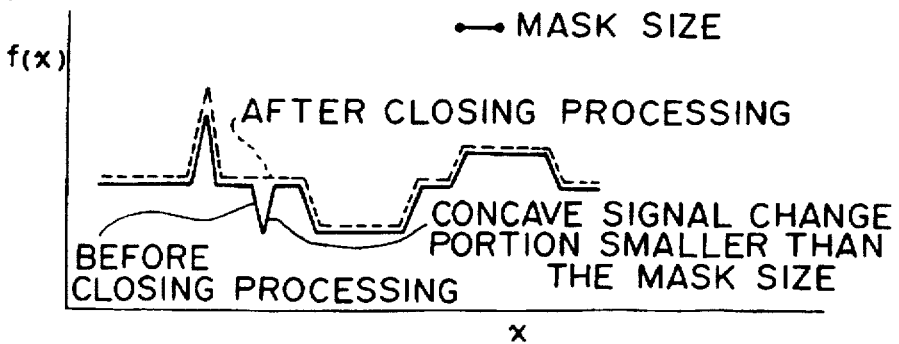
FIG. 8D is a graph showing how a closing processing, which is one of fundamental morphology operations, is carried out.
Figure 9:
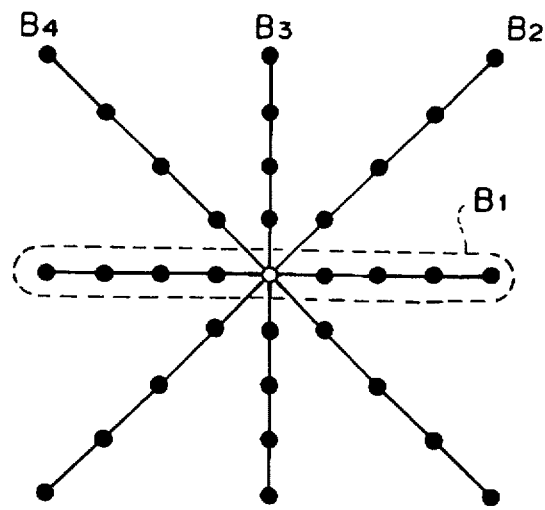
FIG. 9 is an explanatory view showing four linear structure elements, which constitute a multiply structure element Bi employed in a morphology operation.

As the function f(Lu), which determines the rate of compression of the dynamic range and is stored in the compression rate determining function storage means 46, in lieu of the function f(Lu) shown in FIG. 6, a function f(Lu) shown in FIG. 7 may be employed. The function f(Lu) shown in FIG. 7 is a monotonously decreasing function, the value of which decreases monotonously as the value of the unsharp mask signal Lu increases. The function f(Lu) shown in FIG. 7 takes a fixed number of zero with respect to the region of the unsharp mask signal Lu up to a point e ($Lu \leq e$) and is inclined along a straight line with respect to a region larger than the point e ($e < Lu$). In cases where the function f(Lu) shown in FIG. 7 is employed, the dynamic range in the region, in which the value of the unsharp mask signal Lu is large, i.e. in the region in which the mean image density is high, is compressed. Also, the contrast of fine image structures, which are constituted of comparatively high frequency components and are located in the respective image regions, can be kept in the state prior to the compression.

Figure 10:
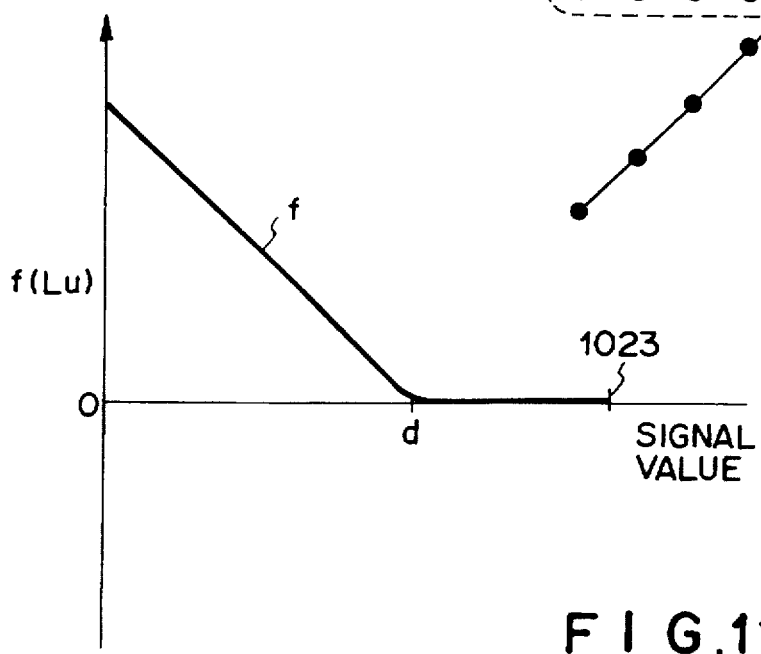
FIG. 10 is a graph showing a further different example of a function f(Lu), which determines the rate of compression of a dynamic range.

As another alternative, as the function f(Lu), which determines the rate of compression of the dynamic range, it is possible to employ a function, the value of which decreases monotonously as the value of the unsharp mask signal Lu increases, and in which the differential coefficient is continuous. For example, as illustrated in FIG. 10, it is possible to employ a monotonously decreasing function, the value of which decreases monotonously as the value of the unsharp mask signal Lu ($0 \leq Lu \leq 1,023$) increases. The function f(Lu) shown in FIG. 10 is inclined along a straight line with respect to a region up to a point immediately prior to a point d ($Lu \leq d$). Also, the function f(Lu) takes a fixed number of zero with respect to the region starting with a point slightly exceeding the point d ($d<Lu$). The line representing the function f(Lu) is not folded sharply at the point d, but the differential coefficient of the function f(Lu) is continuous.

In the aforesaid embodiment, the mean value of the image signal values within the rectangular unsharp mask having the shorter sides extending in the direction, along which the change in image density is sharp, is employed as the unsharp mask signal Lu in Formula (1). However, the method and apparatus for compressing a dynamic range of an image in accordance with the present invention are not limited to the aforesaid embodiment. For example, a square unsharp mask may be employed. In such cases, by way of example, one of the following may be employed as the unsharp mask signal Lu:

(1) The unsharp mask signal Lu representing the mean value calculated from only the image signal values, which are among the image signal values of all picture elements located within the unsharp mask, and the differences of which from the image signal value of the middle picture element in the unsharp mask are not larger than a predetermined threshold value.

(2) The unsharp mask signal Lu obtained in the manner described below. Specifically, as for the image signal values, which are among the image signal values of all picture elements located within the unsharp mask, and the differences of which from the image signal value of the middle picture element in the unsharp mask are not larger than a predetermined threshold value, the image signal values are used directly as the image signal values for the calculation of the unsharp mask signal Lu. As for the image signal values, which are among the image signal values of all picture elements located within the unsharp mask, and the differences of which from the image signal value of the middle picture element in the unsharp mask are larger than the predetermined threshold value, the predetermined threshold value is used as the image signal values for the calculation of the unsharp mask signal Lu. The mean value calculated from the image signal values for the calculation of the unsharp mask signal Lu is taken as the value of the unsharp mask signal Lu.

(3) The unsharp mask signal Lu obtained in the manner described below. Specifically, the morphology operation is carried out on the original image signal Dorg and with Formula (2) or Formula (3) by using a structure element Bi, which is larger than a spatial fluctuation range of image signal values corresponding to an image portion representing an unnecessary tissue or noise in the image, and a scale factor $\lambda$. The morphology signal Dmor obtained from the morphology operation is employed as the unsharp mask signal Lu.

Also, in the aforesaid embodiment, the monotonously decreasing function is employed as the function f(Lu), which determines the rate of compression. However, the method and apparatus for compressing a dynamic range of an image in accordance with the present invention are not limited to the use of the monotonously decreasing function.

Figure 11:
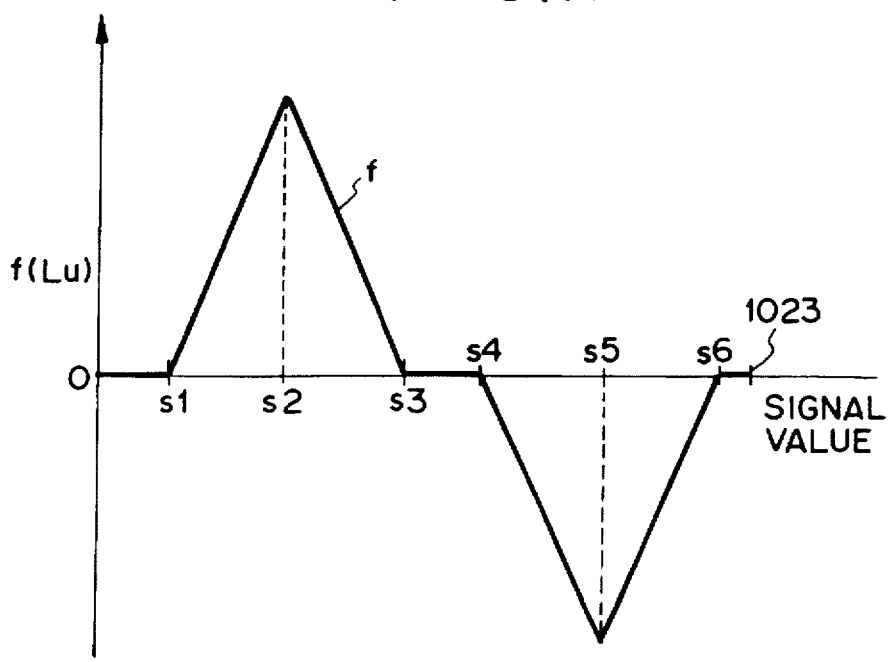
FIG. 11 is a graph showing a still further different example of a function f(Lu), which determines the rate of compression of a dynamic range.

For example, a function f(Lu) having a function form shown in FIG. 11 may be employed. The function f(Lu) shown in FIG. 11 has the characteristics described below. Specifically, (i) with respect to a region from a signal value of zero to a signal value of s1, the function f(Lu) takes a fixed number of zero regardless of the value of the unsharp mask signal Lu, (ii) with respect to a region from the signal value of s1 to a signal value of s2, the value of the function f(Lu) increases monotonously as the value of the unsharp mask signal Lu increases, (iii) with respect to a region from the signal value of s2 to a signal value of s5, the value of the function f(Lu) decreases monotonously as the value of the unsharp mask signal Lu increases, (iv) with respect to a region from the signal value of s5 to a signal value of s6, the value of the function f(Lu) increases monotonously as the value of the unsharp mask signal Lu increases, and (v) with respect to a region from the signal value of s6 to a signal value of 1,023, the function f(Lu) takes a fixed number of zero regardless of the value of the unsharp mask signal Lu.

In cases where the function f(Lu) shown in FIG. 11 is employed, the contrast of fine image structures, which are located in each of image portions, such as portions having low levels of image density and portions having high levels of image density, corresponding to the region of interest in the image [the signal region (iii) described above] and which contain comparatively high frequency components, can be kept high. Also, with respect to the image portions [the signal regions (i), (ii), (iv), and (v) described above] other than the region of interest, for example, a background region and an irradiation field stop region, the compression exceeding a necessary degree is not, effected. Therefore, the contrast of the region of interest with respect to the other regions can be kept high.

In the embodiments described above, an X-ray image is read out from a stimulable phosphor sheet, and an image signal is thereby generated. However, the method and apparatus for compressing a dynamic range of an image in accordance with the present invention are broadly applicable when image signals are detected from various kinds of recording media, on which images have been recorded, e.g. when an X-ray image is read out from X-ray film.

What is claimed is:

1. A method for compressing a dynamic range of an image, comprising the steps of:

i) calculating an unsharp mask signal Lu, which corresponds to super-low frequency, from an original image signal Dorg representing an original image, ii) changing the rate of compression, at which the dynamic range of the original image is compressed, in accordance with the unsharp mask signal Lu, and iii) carrying out a dynamic range compressing process with respect to each of picture elements in the original image, with the rate of compression being thus changed for each of the picture elements, the dynamic range compressing process being carried out with Formula (1)

$$Dproc = Dorg + f(Lu) \quad (1)$$

where f(Lu) is a function of Lu, a processed image signal Dproc being thereby obtained, wherein the unsharp mask signal Lu represents the mean value of the image signal values of all picture elements located within a rectangular unsharp mask having shorter sides, which extend across an edge of a region of interest in the original image, and longer sides extending in the direction along which the edge extends.

2. A method as defined in claim 1 wherein the function f(Lu) in accordance with the unsharp mask signal Lu in Formula (1) is a monotonously decreasing function, the value of which decreases monotonously as the value of the unsharp mask signal Lu increases.

3. A method as defined in claim 1 wherein the original image is a radiation image.

4. A method as defined in claim 3 wherein the radiation image has been stored on a stimulable phosphor sheet.

5. A method as defined in claim 4 wherein the original image signal Dorg representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

6. A method as defined in claim 3 wherein the radiation image has been recorded on photographic film.

7. A method for compressing a dynamic range of an image, comprising the steps of:
   i) calculating an unsharp mask signal Lu, which corresponds to super-low frequency, from an original image signal Dorg representing an original image,
   ii) changing the rate of compression, at which the dynamic range of the original image is compressed, in accordance with the unsharp mask signal Lu, and
   iii) carrying out a dynamic range compressing process with respect to each of picture elements in the original image, with the rate of compression being thus changed for each of the picture elements, the dynamic range compressing process being carried out with Formula (1)

$$Dproc = Dorg + f(Lu) \quad (1)$$

where f(Lu) is a function of Lu, a processed image signal Dproc being thereby obtained, wherein the unsharp mask signal Lu represents the mean value calculated from only the image signal values, which are among the image signal values of all picture elements located within an unsharp mask, that is set in order to obtain the unsharp mask signal Lu, and the differences of which from the image signal value of a middle picture element in the unsharp mask are not larger than a predetermined threshold value.

8. A method as defined in claim 7 wherein the function f(Lu) in accordance with the unsharp mask signal Lu in Formula (1) is a monotonously decreasing function, the value of which decreases monotonously as the value of the unsharp mask signal Lu increases.

9. A method as defined in claim 7 wherein the original image is a radiation image.

10. A method as defined in claim 9 wherein the radiation image has been stored on a stimulable phosphor sheet.

11. A method as defined in claim 10 wherein the original image signal Dorg representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

12. A method as defined in claim 9 wherein the radiation image has been recorded on photographic film.

13. A method for compressing a dynamic range of an image, comprising the steps of:
   i) calculating an unsharp mask signal Lu, which corresponds to super-low frequency, from an original image signal Dorg representing an original image,
   ii) changing the rate of compression, at which the dynamic range of the original image is compressed, in accordance with the unsharp mask signal Lu, and
   iii) carrying out a dynamic range compressing process with respect to each of picture elements in the original image, with the rate of compression being thus changed for each of the picture elements, the dynamic range compressing process being carried out with Formula (1)

$$Dproc = Dorg + f(Lu) \quad (1)$$

where f(Lu) is a function of Lu, a processed image signal Dproc being thereby obtained,
   wherein as for the image signal values, which are among the image signal values of all picture elements located within an unsharp mask, that is set in order to obtain the unsharp mask signal Lu, and the differences of which from the image signal value of a middle picture element in the unsharp mask are not larger than a predetermined threshold value, the image signal values are used directly as the image signal values for the calculation of the unsharp mask signal Lu,
   as for the image signal values, which are among the image signal values of all picture elements located within the unsharp mask, and the differences of which from the image signal value of the middle picture element in the unsharp mask are larger than the predetermined threshold value, the predetermined threshold value is used as the image signal values for the calculation of the unsharp mask signal Lu, and
   the mean value calculated from the image signal values for the calculation of the unsharp mask signal Lu is taken as the value of the unsharp mask signal Lu.

14. A method as defined in claim 13 wherein the function f(Lu) in accordance with the unsharp mask signal Lu in Formula (1) is a monotonously decreasing function, the value of which decreases monotonously as the value of the unsharp mask signal Lu increases.

15. A method as defined in claim 13 wherein the original image is a radiation image.

16. A method as defined in claim 15 wherein the radiation image has been stored on a stimulable phosphor sheet.

17. A method as defined in claim 16 wherein the original image signal Dorg representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

18. A method as defined in claim 15 wherein the radiation image has been recorded on photographic film.

19. A method for compressing a dynamic range of an image, comprising the steps of:
   i) carrying out a morphology operation on an original image signal Dorg, which represents an original image, the morphology operation being carried out with Formula (2) or Formula (3) by using a structure element Bi, which is larger than a spatial fluctuation range of image signal values corresponding to an image portion representing an unnecessary tissue or noise in the original image, and a scale factor λ, a morphology signal Dmor being obtained from the morphology operation, $$Dmor = Dorg - \max_{i=1,\ldots,n} \{(Dorg \ominus \lambda Bi) \oplus \lambda Bi\} \quad (2)$$

wherein the expression $X \ominus \lambda Y$ represents that λ times of calculations for finding the Minkowski difference are carried out with the structure element Y on the image signal X, and the expression $X \oplus \lambda Y$ represents that $\lambda$ times of calculations for finding the Minkowski sum are carried out with the structure element Y on the image signal X, $$Dmor = Dorg - \min_{i=1,\ldots,n} \{(Dorg \ominus \lambda Bi) \oplus \lambda Bi\} \quad (3)$$

wherein the expression $X \oplus \lambda Y$ represents that $\lambda$ times of calculations for finding the Minkowski sum are carried out with the structure element Y on the image signal X, and the expression $X E) \lambda Y$ represents that $\lambda$ calculations for finding the Minkowski difference are carried out with the structure element Y on the image signal X, ii) changing the rate of compression, at which the dynamic range of the original image is compressed, in accordance with the morphology signal Dmor having been obtained from the morphology operation, and iii) carrying out a dynamic range compressing process with respect to each of picture elements in the original image, with the rate of compression being thus changed for each of the picture elements, the dynamic range compressing process being carried out with Formula (4)

$$Dproc = Dorg + f(Dmor) \quad (4)$$

where f(Dmor) is a function of Dmor, a processed image signal Dproc being thereby obtained.

20. A method as defined in claim 19 wherein the function f(Dmor) in accordance with the morphology signal Dmor in Formula (4) is a monotonously decreasing function, the value of which decreases monotonously as the value of the morphology signal Dmor increases.

21. A method as defined in claim 19 wherein the original image is a radiation image.

22. A method as defined in claim 21 wherein the radiation image has been stored on a stimulable phosphor sheet.

23. A method as defined in claim 22 wherein the original image signal Dorg representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

24. A method as defined in claim 21 wherein the radiation image has been recorded on photographic film.

25. An apparatus for compressing a dynamic range of an image, comprising:

i) an unsharp mask signal calculating means for calculating an unsharp mask signal Lu, which corresponds to super-low frequency, from an original image signal Dorg representing an original image, ii) a compression rate determining function storage means for storing information about a function representing the rate of compression f(Lu), at which the dynamic range of the original image is compressed, the unsharp mask signal Lu, which has been obtained from the unsharp mask signal calculating means, serving as a variable in the function f(Lu), and iii) a dynamic range compressing operation means for carrying out a dynamic range compressing process with respect to each of picture elements in the original image, by using the rate of compression f(Lu) for each of the picture elements, which rate of compression is obtained in accordance with the function stored in the compression rate determining function storage means, the dynamic range compressing process being carried out with Formula (1)

$$Dproc = Dorg + f(Lu) \quad (1)$$

a processed image signal Dproc being thereby obtained, wherein the unsharp mask signal calculating means calculates, as the unsharp mask signal Lu, the mean value of the image signal values of all picture elements located within a rectangular unsharp mask having shorter sides, which extend across an edge of the region of interest in the original image, and longer sides extending in the direction along which the edge extends.

26. An apparatus as defined in claim 25 wherein the function f(Lu) in accordance with the unsharp mask signal Lu in Formula (1) is a monotonously decreasing function, the value of which decreases monotonously as the value of the unsharp mask signal Lu increases.

27. An apparatus as defined in claim 25 wherein the original image is a radiation image.

28. An apparatus as defined in claim 27 wherein the radiation image has been stored on a stimulable phosphor sheet.

29. An apparatus as defined in claim 28 wherein the original image signal Dorg representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

30. An apparatus as defined in claim 27 wherein the radiation image has been recorded on photographic film.

31. An apparatus for compressing a dynamic range of an image, comprising:

i) an unsharp mask signal calculating means for calculating an unsharp mask signal Lu, which corresponds to super-low frequency, from an original image signal Dorg representing an original image, ii) a compression rate determining function storage means for storing information about a function representing the rate of compression f(Lu), at which the dynamic range of the original image is compressed, the unsharp mask signal Lu, which has been obtained from the unsharp mask signal calculating means, serving as a variable in the function f(Lu), and iii) a dynamic range compressing operation means for carrying out a dynamic range compressing process with respect to each of picture elements in the original image, by using the rate of compression f(Lu) for each of the picture elements, which rate of compression is obtained in accordance with the function stored in the compression rate determining function storage means, the dynamic range compressing process being carried out with Formula (1)

$$Dproc = Dorg + f(Lu) \quad (1)$$

a processed image signal Dproc being thereby obtained, wherein the unsharp mask signal calculating means calculates, as the unsharp mask signal Lu, the mean value calculated from only the image signal values, which are among the image signal values of all picture elements located within an unsharp mask, that is set in order to obtain the unsharp mask signal Lu, and the differences of which from the image signal value of a middle picture element in the unsharp mask are not larger than a predetermined threshold value.

32. An apparatus as defined in claim 31 wherein the function f(Lu) in accordance with the unsharp mask signal Lu in Formula (1) is a monotonously decreasing function, the value of which decreases monotonously as the value of the unsharp mask signal Lu increases.

33. An apparatus as defined in claim 31 wherein the original image is a radiation image.

34. An apparatus as defined in claim 33 wherein the radiation image has been stored on a stimulable phosphor sheet.

35. An apparatus as defined in claim 34 wherein the original image signal Dorg representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

36. An apparatus as defined in claim 33 wherein the radiation image has been recorded on photographic film.

37. An apparatus for compressing a dynamic range of an image, comprising:
   i) an unsharp mask signal calculating means for calculating an unsharp mask signal Lu, which corresponds to super-low frequency, from an original image signal Dorg representing an original image,
   ii) a compression rate determining function storage means for storing information about a function representing the rate of compression f(Lu), at which the dynamic range of the original image is compressed, the unsharp mask signal Lu, which has been obtained from the unsharp mask signal calculating means, serving as a variable in the function f(Lu), and
   iii) a dynamic range compressing operation means for carrying out a dynamic range compressing process with respect to each of picture elements in the original image, by using the rate of compression f(Lu) for each of the picture elements, which rate of compression is obtained in accordance with the function stored in the compression rate determining function storage means, the dynamic range compressing process being carried out with Formula (1)

$$Dproc = Dorg + f(Lu) \tag{1}$$

a processed image signal Dproc being thereby obtained, wherein as for the image signal values, which are among the image signal values of all picture elements located within an unsharp mask, that is set in order to obtain the unsharp mask signal Lu, and the differences of which from the image signal value of a middle picture element in the unsharp mask are not larger than a predetermined threshold value, the image signal values are used directly as the image signal values for the calculation of the unsharp mask signal Lu, as for the image signal values, which are among the image signal values of all picture elements located within the unsharp mask, and the differences of which from the image signal value of the middle picture element in the unsharp mask are larger than the predetermined threshold value, the predetermined threshold value is used as the image signal values for the calculation of the unsharp mask signal Lu, and the unsharp mask signal calculating means calculates, as the unsharp mask signal Lu, the mean value calculated from the image signal values for the calculation of the unsharp mask signal Lu.

38. An apparatus as defined in claim 37 wherein the function f(Lu) in accordance with the unsharp mask signal Lu in Formula (1) is a monotonously decreasing function, the value of which decreases monotonously as the value of the unsharp mask signal Lu increases.

39. An apparatus as defined in claim 37 wherein the original image is a radiation image.

40. An apparatus as defined in claim 39 wherein the radiation image has been stored on a stimulable phosphor sheet.

41. An apparatus as defined in claim 40 wherein the original image signal Dorg representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

42. An apparatus as defined in claim 39 wherein the radiation image has been recorded on photographic film.

43. An apparatus for compressing a dynamic range of an image, comprising:
   i) a morphology signal operation means for carrying out a morphology operation on an original image signal Dorg, which represents an original image, the morphology operation being carried out with Formula (2) or Formula (3) by using a structure element Bi, which is larger than a spatial fluctuation range of image signal values corresponding to an image portion representing an unnecessary tissue or noise in the original image, and a scale factor λ, a morphology signal Dmor, which is represented by Formula (2) or Formula (3), being obtained from the morphology signal operation means, $$Dmor = Dorg - \max_{i=1,\ldots,n} \{(Dorg \ominus \lambda Bi) \oplus \lambda Bi\} \tag{2}$$

wherein the expression $X \ominus \lambda Y$ represents that λ times of calculations for finding the Minkowski difference are carried out with the structure element Y on the image signal X, and the expression $X \oplus \lambda Y$ represents that λ times of calculations for finding the Minkowski sum are carried out with the structure element Y on the image signal X, $$Dmor = Dorg - \min_{i=1,\ldots,n} \{(Dorg \oplus \lambda Bi) \ominus \lambda Bi\} \tag{3}$$

wherein the expression $X \oplus \lambda Y$ represents that λ times of calculations for finding the Minkowski sum are carried out with the structure element Y on the image signal X, and the expression $X \ominus \lambda Y$ represents that λ times of calculations for finding the Minkowski difference are carried out with the structure element Y on the image signal X, ii) a compression rate determining function storage means for storing information about a function representing the rate of compression f(Dmor), at which the dynamic range of the original image is compressed, the morphology signal Dmor, which has been obtained from the morphology signal operation means, serving as a variable in the function f(Dmor), and
   iii) a dynamic range compressing operation means for carrying out a dynamic range compressing process with respect to each of picture elements in the original image, by using the rate of compression f(Dmor) for each of the picture elements, which rate of compression is obtained in accordance with the function stored in the compression rate determining function storage means, the dynamic range compressing process being carried out with Formula (4)

$$Dproc = Dorg + f(Dmor) \tag{4}$$

a processed image signal Dproc being thereby obtained.

44. An apparatus as defined in claim 43 wherein the function f(Dmor) in accordance with the morphology signal Dmor in Formula (4) is a monotonously decreasing function, the value of which decreases monotonously as the value of the morphology signal Dmor increases.

45. An apparatus as defined in claim 43 wherein the original image is a radiation image.

46. An apparatus as defined in claim 45 wherein the radiation image has been stored on a stimulable phosphor sheet.

47. An apparatus as defined in claim 46 wherein the original image signal Dorg representing the radiation image is obtained by exposing the stimulable phosphor sheet to stimulating rays, which cause the stimulable phosphor sheet to emit light in proportion to the amount of energy stored thereon during its exposure to the radiation, and photoelectrically detecting the emitted light.

48. An apparatus as defined in claim 45 wherein the radiation image has been recorded on photographic film.

* * * * *